(12) United States Patent
Pérez (10) Patent No.: US 11,313,399 B2
(45) Date of Patent: Apr. 26, 2022

(54) TOOLLESS SLOT FASTENER

(71) Applicant: A. RAYMOND ET CIE, Grenoble (FR)

(72) Inventor: Lara Rubio Pérez, Barcelona (ES)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 16/717,700

(22) Filed: Dec. 17, 2019

(65) Prior Publication Data

US 2020/0200203 A1  Jun. 25, 2020

(30) Foreign Application Priority Data

Dec. 21, 2018  (EP) ..................................... 18382988

(51) Int. Cl.
*F16B 21/07* (2006.01)

(52) U.S. Cl.
CPC .................................. *F16B 21/075* (2013.01)

(58) Field of Classification Search
CPC .... F16B 21/075; F16B 21/088; F16B 5/0628; F16B 21/086; F16B 5/0664; B60R 13/0206
See application file for complete search history.

(56) References Cited

U.S. PATENT DOCUMENTS

| | | |
|---|---|---|
| 3,890,711 A | 6/1975 | Burns |
| 4,730,913 A | 3/1988 | Boothe |
| 4,905,745 A | 3/1990 | Jaeger |
| 6,450,459 B2 | 9/2002 | Nakanishi |

(Continued)

FOREIGN PATENT DOCUMENTS

| | | |
|---|---|---|
| CN | 205415386 U | 8/2016 |
| DE | 102010022556 B3 | 6/2011 |

(Continued)

OTHER PUBLICATIONS

Machine assisted English translation of DE102010022556B3 obtained from https://patents.google.com/patent on Mar. 19, 2020, 7 pages.

(Continued)

*Primary Examiner* — Robert Sandy
*Assistant Examiner* — Louis A Mercado
(74) *Attorney, Agent, or Firm* — Warner Norcross + Judd LLP (57) ABSTRACT

An improved slot fastener is provided, which may be toollessly installed, adjusted or repositioned, and uninstalled. The slot fastener includes a body having a surface, a head extending from the surface of the body, and a pair of clips, each clip being disposed at opposing lateral sides of the head. Each clip includes a flange that project laterally outward from the opposing lateral sides of the head, and a handle that projects outwardly from opposing lateral sides of the body. The clips are adapted to pivot laterally relative to the head in response to movement of the handle to alternate the slot fastener between an engaged configuration and a disengaged configuration. Methods of installing the slot into a channel of a component and adjusting the slot fastener along the channel, and an assembly including the slot fastener installed within the channel of the component, are also provided.

15 Claims, 5 Drawing Sheets

(56) References Cited

U.S. PATENT DOCUMENTS

| | | | |
|---|---|---|---|
| 6,471,252 B1 | 10/2002 | Moretti et al. | |
| 6,827,531 B2 | 12/2004 | Womack et al. | |
| 7,036,775 B2 | 5/2006 | Nakanishi | |
| 7,316,374 B2 | 1/2008 | Maruyama | |
| 7,637,527 B2* | 12/2009 | Mazanek | B60R 21/04 |
| | | | 280/728.2 |
| 8,590,223 B2* | 11/2013 | Kilgore | H02S 20/24 |
| | | | 52/173.3 |
| 9,127,740 B2 | 9/2015 | Shinoda | |
| 9,267,622 B2* | 2/2016 | Kobayashi | F16L 3/02 |
| 9,331,629 B2 | 5/2016 | Cheung et al. | |
| 10,471,909 B2* | 11/2019 | Abe | B60R 13/0206 |
| 10,641,416 B2* | 5/2020 | Shinba | F16L 3/137 |
| 10,670,059 B2* | 6/2020 | Jackson, Jr. | F16B 5/0642 |
| 2011/0097137 A1 | 4/2011 | Spitz | |
| 2011/0147553 A1 | 6/2011 | Ostermeier et al. | |
| 2013/0183089 A1 | 7/2013 | Podsadny et al. | |
| 2013/0243523 A1 | 9/2013 | De Jong et al. | |
| 2014/0000085 A1* | 1/2014 | Teller | B25B 15/007 |
| | | | 29/426.6 |
| 2018/0050610 A1 | 2/2018 | Hattori et al. | |

FOREIGN PATENT DOCUMENTS

| | | |
|---|---|---|
| DE | 102012011563 A1 | 12/2013 |
| EP | 0088203 A1 | 9/1983 |
| EP | 0977960 A1 | 2/2000 |
| EP | 1092903 A1 | 4/2001 |
| EP | 2866978 A1 | 5/2015 |
| EP | 3124844 A1 | 2/2017 |
| ES | 270531 U | 7/1983 |
| WO | 1999031427 A1 | 6/1999 |
| WO | 2012022545 A1 | 2/2012 |
| WO | 2012022568 A1 | 2/2012 |
| WO | 2014008085 A1 | 1/2014 |

OTHER PUBLICATIONS

Machine assisted English translation of CN205415386U obtained from https://patents.google.com/patent on Aug. 3, 2016, 4 pages.
Machine assisted English translation of DE102012011563A1 obtained from https://patents.google.com/patent on Mar. 19, 2020, 10 pages.
Machine assisted English translation of EP1092903A1 obtained from https://patents.google.com/patent on Mar. 19, 2020, 5 pages.
Machine assisted English translation of EP0977960A1 obtained from https://patents.google.com/patent on Mar. 19, 2020, 6 pages.
Machine assisted English translation of EP0088203A1 obtained from https://patents.google.com/patent on Mar. 19, 2020, 5 pages.

* cited by examiner

TOOLLESS SLOT FASTENER

CROSS-REFERENCE TO RELATED APPLICATIONS

This application claims priority to European Patent Application No. 18382988.6, filed Dec. 21, 2018, which is incorporated herein by reference in its entirety.

FIELD OF THE INVENTION

The present disclosure generally relates to slot fasteners and, more specifically, to a toolless adjustable slot fastener and related methods and assemblies.

DESCRIPTION OF THE RELATED ART

Slot fasteners are used in various industries and home applications to couple an object to a slot, typically at a fixed position along the slot. For example, a set of slot fasteners may be used to secure various components to a surface defining one or more slots or channels, which each single slot fastener being used to secure a component to the surface at a particular position along a slot. Slots commonly used with slot fasteners include C-slots/channels, T-slots/channels, etc.

Despite their advantages, many conventional slot fasteners include separable components, which inconveniently complicate assembly/use and increase the chance for misplacement and/or of parts. Moreover, repositioning conventional slot fasteners typically requires removing an entire slot fastener or various portions thereof from a slot, and subsequently reinstalling the slot fastener in a new location along the slot. However, such conventional slot fasteners are not easily inserted within, repositioned along, or removed from a slot by hand, but instead require tools or other specialized equipment for proper use.

SUMMARY OF THE INVENTION

An improved slot fastener is provided. The slot fastener includes a body having a surface, a head extending from the surface of the body, and a pair of clips, each clip being disposed at opposing lateral sides of the head. Each clip includes a flange that projects laterally outward from the opposing lateral sides of the head, and a handle that projects outwardly from opposing lateral sides of the body. Each clip is adapted to pivot laterally relative to the head in response to movement of the handle away from or toward the surface of the body to allow the slot fastener to alternate between an engaged configuration and a disengaged configuration.

A method of installing the slot fastener (i.e., the "installation method") is also provided. The installation method includes inserting the head of the slot fastener into a channel of a component. The installation method also includes moving the handles of each clip laterally outward and toward the surface of the body to pivot each clip and place the slot fastener in the engaged configuration, thereby installing the slot fastener.

A method of adjusting or repositioning the installed slot fastener along the channel of the component (i.e., the "adjustment method") is further provided. The adjustment method includes moving the handles of each clip laterally inward and away from the surface of the body to pivot each clip and placing the slot fastener in the disengaged configuration. The adjustment method also includes moving the head of the slot fastener along a length of the channel, without removing the head from the channel. The adjustment method further includes placing the slot fastener in the engaged configuration.

An assembly comprising the slot fastener installed within the channel of the component is also provided.

These and other features and advantages of the present disclosure will become apparent from the following description of particular embodiments, when viewed in accordance with the accompanying drawings and appended claims.

DETAILED DESCRIPTION OF THE INVENTION

An improved slot fastener is provided. As described herein, the slot fastener is adapted for use by hand (i.e., without need for a tool or other specialized equipment), and may be adjusted and/or repositioned during use without disassembly or removal from fastened components. Moreover, the design and material construction of the slot fastener provide increased usability and convenience, reduced maintenance and number of parts, and/or decreased need for paint or other surface treatments (e.g. those necessary to prevent corrosion). Referring generally to the Figures, wherein like numerals indicate corresponding parts throughout the several views, the slot fastener is illustrated and generally designated at 10. Certain features of the slot fastener 10 are functional, but can be implemented in different aesthetic configurations.

Figure 2:
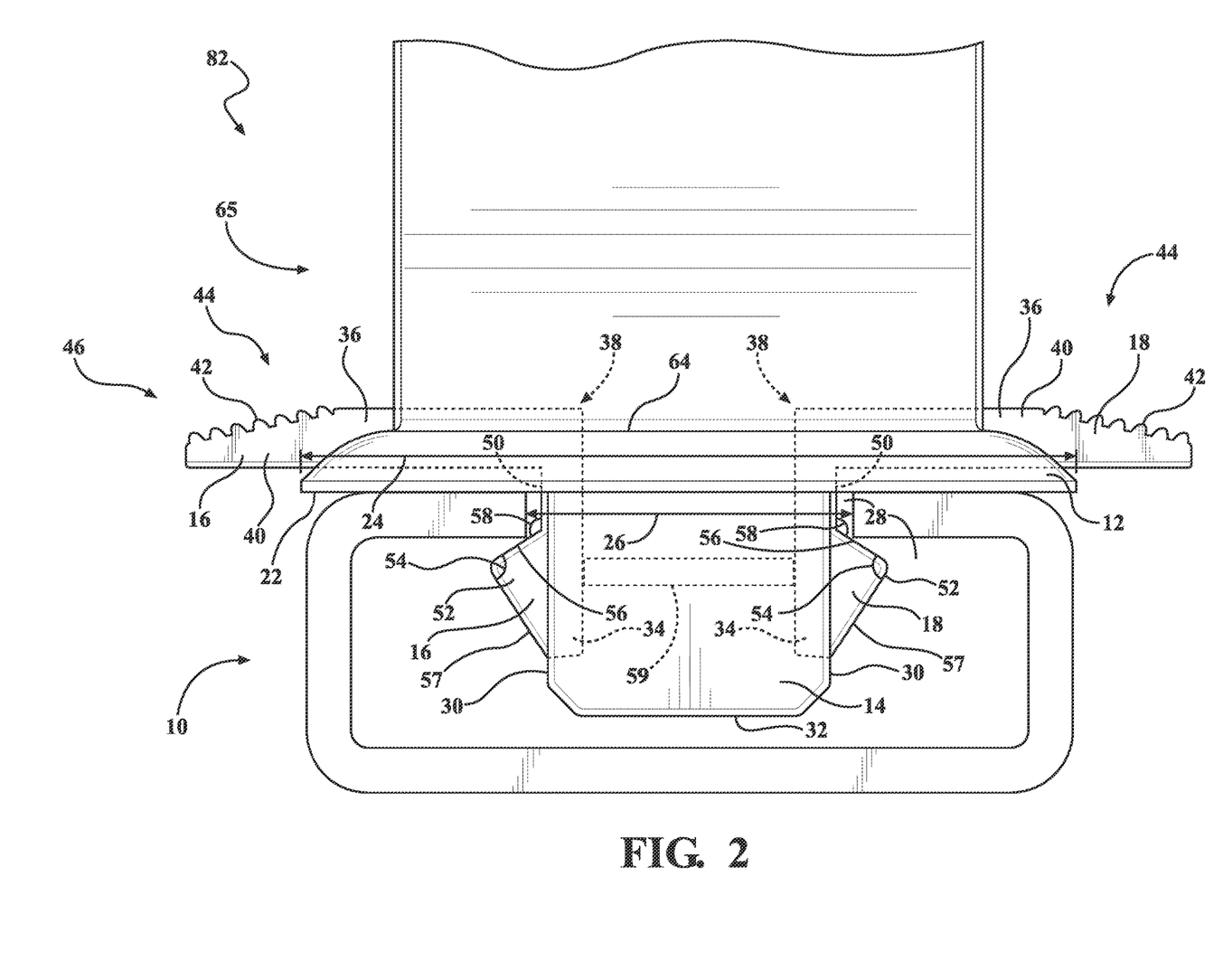
FIG. 2 is an environmental end-view of an assembly comprising a slot fastener installed within a channel of a component, in accordance with certain embodiments of the present disclosure.
Figure 4:
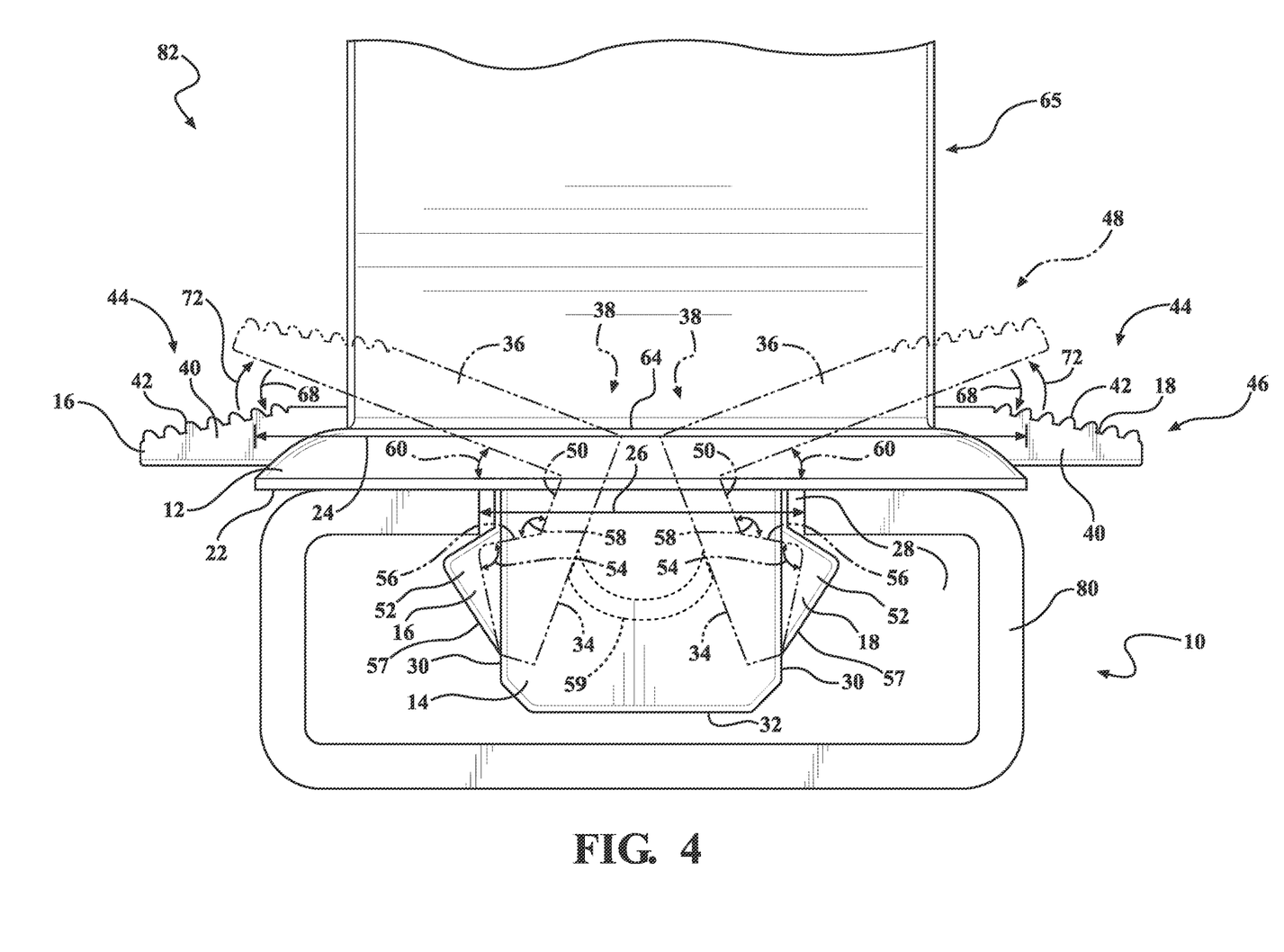
FIG. 4 is an environmental end-view of a slot fastener, in accordance with particular embodiments of the present disclosure, in an engaged configuration (solid lines) and a disengaged configuration (phantom lines)
Figure 5:
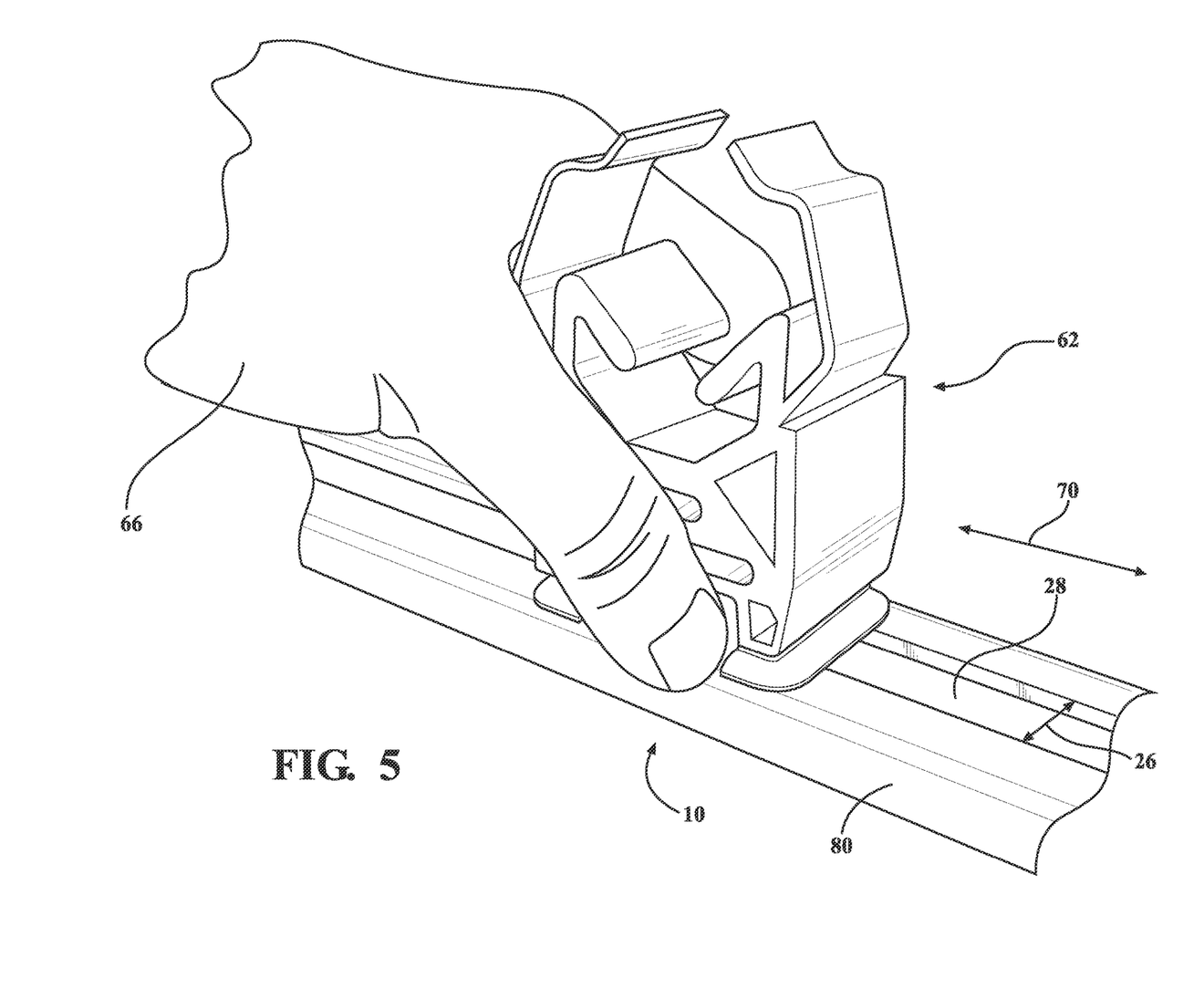
FIG. 5 is an environmental profile view of a slot fastener having an integral pipe fastener in accordance with additional embodiments of the present disclosure.

The slot fastener 10 includes a body 12. The body 12 is not limited with regards to shape, size, dimensions, etc. Rather, as will be understood by one of skill in the art, the body 12 may be any shape and/or size suitable for performing the functions of the body 12 as described herein. For example, in certain embodiments, the body 12 comprises a substantially cuboid shape (i.e., has a rectangular cross-section), a substantially cylindrical shape, a substantially polygonal prismatic shape, etc. However, the body 12 need not be consistent with respect to a particular shape, but may instead comprise various portions of differing shapes. For example, in certain embodiments, the body 12 comprises a projection or rim 64, as described in further detail below. In these or other embodiments, the body may be shaped or adapted to be coupled with and/or secured to a structural element 65, which may be a pipe, tube, post, slat, etc. For example, in certain embodiments, as illustrated in FIG. 5, the body 12 comprises a fastener portion 62, which may be adapted to be disposed within a cavity of the structural element 65 to fasten the body 12 thereto. While not shown, in some embodiments, the fastener portion 62 may be adapted (e.g. shaped, threaded, etc.) to receive a portion of the structural element 65, a fastener (e.g. a bolt, screw, clip, adhesive, etc.), or both. In particular embodiments, as illustrated in FIGS. 2 and 4, the structural element 65 is fastened to the body 12, such that the slot fastener 10 comprises the structural element 65. In some such embodiments, the structural element 65 is a pipe or tube. It is to be appreciated that, in such embodiments, the structural element 65 may be fastened to the body 12 reversibly (e.g. via the fastener portion 62, a reversible fastener, etc.), irreversibly (e.g. welded, bonded, etc.), or both.

Regardless of the overall shape, the body 12 typically comprises opposing lateral sides 13. Each of the opposing lateral sides 13 may be independently configured, and may flat, rounded (e.g. concave or convex), textured, patterned, solid, latticed, etc. Additionally, the body 12 itself may be solid, hollow (e.g. define one or more cavities), or a combination thereof. For example, in certain embodiments, the body 12 defines cavities or voids therein, which may reduce the weight and/or material needs and/or increase a structural property (e.g. strength, rigidity, compression, etc.) of the body 12.

Figure 1:
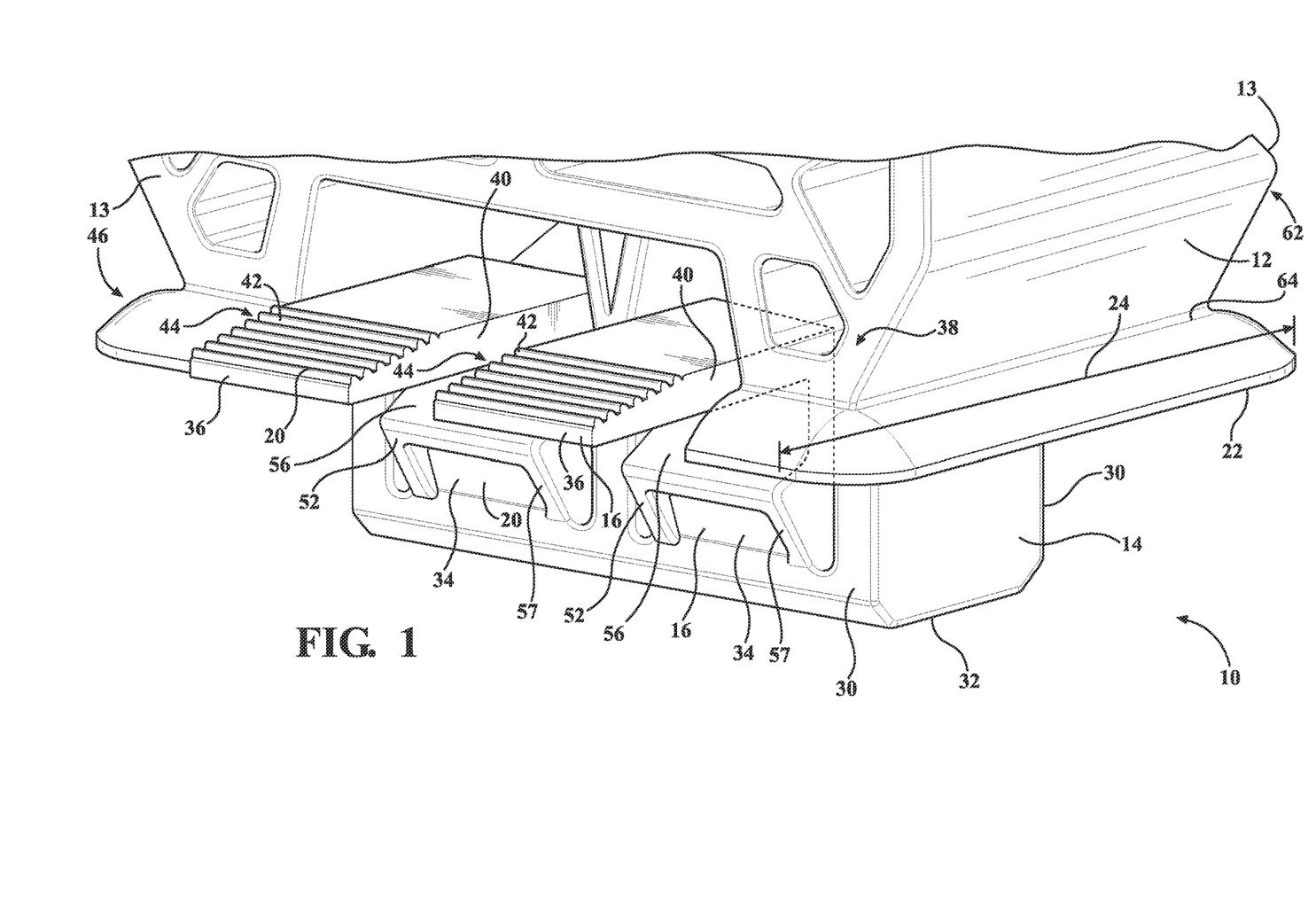
FIG. 1 is a profile view of a slot fastener in accordance with some embodiments of the present disposure.

The body 12 includes a surface 22. The surface 22 is not particularly limited, and may be defined by any portion(s) of the body 12. For example, in certain embodiments, the body 12 comprises the projection or rim 64, which defines the surface 22. However, the body 12 may comprise the surface 22 as a side disposed substantially perpendicular to the opposing lateral sides 13. As such, the surface 22 may be generally planar or flat in configuration. However, in various embodiments, the surface 22, or any portion thereof, may be textured or patterned (e.g. serrated, zig-zagged, waved, etc.). Moreover, the surface 22 may be continuous or discontinuous (i.e., broken) with regard to any dimensional characteristic (e.g. length, width, height, perimeter, etc.). For example, in some embodiments, the body 12 comprises multiple projections (not shown), which each outwardly extend from a perimeter of the body 12 and have a surface coplanar with each other about the body 12. In such embodiments, at least one of the projections extends laterally to the body 12, and the collective coplanar surfaces of the multiple projections define the surface 22 of the body 12. As shown in FIG. 1, and as will be described in further detail below, the surface 22 comprises a lateral width 24.

The slot fastener 10 includes a head 14. In general, the head 14 extends outwardly from the surface 22 of the body 12. In certain embodiments, the head 14 extends coaxial with respect to the body 12. However, in some embodiments, the head 14 is not coaxial with respect to the body 12, but is instead offset (e.g. laterally, obliquely, etc.) with respect to the body 12. The particular shape of the head 14 is not limited. Rather, as will be understood by one of skill in the art, the head 14 may be any shape suitable for performing the functions of the head 14 described herein. For example, in certain embodiments, the head 14 has a substantially cuboidal shape (e.g. a rectangular prism, square prism, etc.). Regardless of the particular shape, the head 14 comprises opposing lateral sides 30, which are laterally separated by a distance (i.e., a lateral width) that is less than the lateral width 24 of the surface 22 of the body 12.

The body 12 and the head 14 may be separable components of the slot fastener 10, or may be semi-permanently or permanently fixed to one another. For example, in certain embodiments, the body 12 and the head 14 are integrally formed (e.g. via molding, extrusion, machining, etc.). In some embodiments, the body 12 and the head 14 are fastened together. In such embodiments, the body 12 and the head 14 may be fastened together reversibly (e.g. via a reversible fastener, etc.), irreversibly (e.g. via welding, bonding, etc.), or both.

The slot fastener 10 includes clips 16, 18, which may be collectively referred to as a pair of clips 16, 18. Typically, the clips 16, 18 share a common three-dimensional shape with each other, and are configured within the slot fastener 10 in a 180 degree orientation with respect to each other (i.e., the clips 16, 18 mirror one another about a plane extending between and parallel to the opposing lateral sides 30 of the head 14 and the opposing lateral sides 13 of the body 12). However, in certain embodiments, each of the clips 16, 18 may be independently selected, and may comprise unique characteristics and/or properties (e.g. with respect to shape, dimension, etc.). As such, it is to be appreciated that, in certain embodiments, the clips 16, 18 may be different from one another, e.g. with respect to form and/or function, as described in additional detail below.

While described generally herein in terms of the pair of clips 16, 18, the slot fastener 10 is not so limited, and may comprise any number of additional clips or pairs of clips. For example, in certain embodiments, each clip 16, 18 is disposed at opposing lateral sides 30 of the head 14 such that the slot fastener 10 includes one pair of clips 16, 18. However, in other embodiments, the slot fastener 10 comprises a second pair of clips (not shown) including an additional clip 20, e.g. the slot fastener 10 includes a first pair of clips and a second pair of clips such that the slot fastener 10 includes two pairs of clips, or four clips in total. In such embodiments, the second pair of clips is typically disposed along the opposing lateral sides 30 of the head 14 adjacent the pair of clips 16, 18. While not necessary, as will be appreciated from this disclosure, inclusion of the second pair of clips (e.g. including the additional clip 20) may provide the slot fastener 10 with certain advantages, such as increased mechanical/functional redundancy, reduced likelihood of mechanical failure of the device during use, etc. The second pair of clips may be the same as or different from the pair of clips 16, 18, e.g. with respect to shape, dimensions, material, etc. However, in certain embodiments, each of the clips (e.g. 16, 18, 20, etc.) of the slot fastener 10 are substantially the same.

The clips 16, 18 are disposed at opposing lateral side 30 of the head 14. Typically, each of the clips 16, 18 is pivotably and/or rotatably attached to an end portion 32 of the head 14. The specific type of pivotable attachment is not limited, and be any type of attachment adapted for pivotably securing the clips 16, 18 to the head 14 (e.g. reversibly or irreversibly). For example, in specific embodiments, the clips 16, 18 are integrally formed with and extend from the head 14 at the end portion 32, with the point of extension (not shown) being adapted to function as a living hinge. In certain embodiments, the clips 16, 18 are pivotably attached to the head 14 via respective mounting pins (not shown), which extend parallel to, and through the head 14 at, the opposing lateral sides 30. In such embodiments, each of the clips 16, 18 is adapted to pivot laterally with respect to the head 14 and the body 12 about one of the respective mounting pins, which may be fixed to the head 14 (e.g. via pressure fit into through-holes therein). As such, in certain embodiments, each of the clips 16, 18 defines a bearing surface (not shown) (e.g. a through-hole, which may comprise a bushing, a rotary or rolling bearing, etc., or combinations thereof.) disposed about one of the respective mounting pins. In particular embodiments, however, each of the clips 16, 18 comprises one of the mounting pins (not shown), which may be integral with or otherwise fixed to the clips 16, 18. In such embodiments, the head 14 defines a bearing surface (not shown) for each respective clip 16, 18. It is to be appreciated that the slot fastener 10 may include one or more mounting pins and/or bearing surfaces for each of the clips 16, 18.

Each of the clips 16, 18 typically comprises a handle 40, which may be collectively referred to as the handles 40. The handles 40 project outwardly from the opposing lateral sides 13 of the body 12. As will be appreciated from the description herein, each of the handles 40 is adapted for hand-use (i.e., without use or interference of tools), and functions as a point of manipulation for a user of the slot fastener 10 to pivot the clips 16, 18 with respect to the head 14 and body 12, as described in further detail below. As such, the handles 40 are not particularly limited (e.g. with respect to shape, dimension, etc.). Moreover, the each of the handles 40 may be independently selected and thus the same as or different from any other of the handles 40. In certain embodiments, each of the handles 40 is substantially the same as at least one other handle 40.

Typically, each of the handles 40 extends outwardly beyond the opposing lateral sides 13 of the body 12 for a distance sufficient to allow a user to grip, grab, pull and/or push the handles 40 (e.g. laterally). As such, the length of each of the handles 40 may vary and may be independently selected, e.g. based on the dimensions of the body 12. In certain embodiments, the length of the handles 40 is from 1 to 100 cm, such as from 1 to 50, alternatively from 1 to 25, alternatively from 2 to 20, alternatively from 5 to 20, cm. However, it is to be appreciated that lengths outside these ranges may also be utilized. Additionally, each of the handles 40 may be configured for increased comfort and/or ease of hand-use, e.g. by comprising a textured and/or patterned surface 42 and/or a tapered portion 44. The textured and/or patterned surface 42 may comprise grooves, serrations, projections, etc., or combinations thereof, e.g. for increasing the gripability, aesthetics, and/or feel of the handles 40.

Each of the clips 16, 18 typically comprises a flange 52, which may be collectively referred to as the flanges 52. The flanges 52 of the clips 16, 18 project laterally outward from the opposing lateral sides 30 of the head 14. The flanges 52 are not particularly limited (e.g. with respect to shape, dimension, etc.), and are each typically adapted to engage with (e.g. contact and/or fasten to) a surface and/or projection (e.g. of a component), as described in further detail below. Typically, the flanges 52 are dimensioned to extend outwardly beyond the opposing lateral sides 30 of the head 14 when the clips 16, 18 are pivoted laterally away from the head 14, but not when the clips 16, 18 are pivoted laterally toward the head 14. Said differently, the length of each of the flanges 52 is typically selected (e.g. in view of a width of the head 14, a thickness of the opposing lateral sides 30, etc.) such that the clips 16, 18 may be inwardly pivoted to dispose the entirety of each flange 52 within the head 14, and outwardly pivoted to project at least a portion of each flange 52 outwardly beyond the opposing lateral sides 30 of the head 14.

In certain embodiments, each of the clips 16, 18 comprises a first arm 34 and a second arm 36, which may be collectively referred to as the first arms 34 and the second arms 36, respectively. In these embodiments, with respect to each of the clips 16, 18, the first arm 34 typically comprises the flange 52 and the second arm 36 typically comprises the handle 40. The first arms 34 second arms 36 are not particularly limited (e.g. with respect to shape, dimension, etc.), and are adapted to cooperatively support and/or connect together the handle 40 and the flange 52 of each of the clips 16, 18. As such, the first arms 34 and the second arms 36 may be any shape or combination of shapes, and are typically independently selected. In certain embodiments, each of the first arms 34 and/or the second arms 36 comprises a substantially cuboidal shape (e.g. are shaped as a rectangular prism, square prism, etc.). In some embodiments, the first arms 34 and/or the second arms 36 may be substantially cylindrical in shape. In some embodiments, the first and/or second arms 34, 36 are curved, such that the clips 16, 18 composed thereof comprise an arcuate shape. However, in particular embodiments, each of the first and second arms 34, 36 are substantially linear, and do not include any curves or bends along their respective lengths.

In particular embodiments, the first arm 34 of each of the clips 16, 18 is pivotably/rotatably attached to the end portion 32 of the head 14, such that the first arms 34 may pivot (e.g. about the attachment) with respect to the head 14. The first arm 34 may be so attached to the head 14 in any fashion, such as via hinges or mounting pins as described above.

In certain embodiments, with respect to each of the clips 16, 18 individually, the first arm 34 and the second arm 36 are configured to form a substantially "L"-shape, where the first arm 34 the second arm 36 are joined together and extend generally away perpendicularly with respect to one another, as shown generally in the Figures at 38. In these embodiments, the clips 16, 18 may be referred to as "L"-shaped clips 16, 18. However, it is to be appreciated that the term "L"-shaped may be used in a descriptive, and not an absolute, fashion. For example, in some embodiments, the first and second arms 34, 36 may extend away from each other at an angle of from about 30 to about 95, alternatively of from about 45 to about 95, alternatively of from about 60 to about 95, alternatively of from about 75 to about 95, alternatively of from about 85 to about 95, alternatively of about 90, degrees. Additionally, the first arm 34 may be longer than the second arm 36, the second arm 36 may be longer than the first arm 34, or the first and second arms 34, 36 may be substantially the same length as one another.

With regard to each one of the clips 16, 18 as a whole, the first arm 34, second arm 36, handle 40, and/or flange 52 may be separable components, or may be semi-permanently or permanently fixed to one another. For example, in certain embodiments, the first arm 34, second arm 36, handle 40, and flange 52 are integrally formed (e.g. via molding, extrusion, machining, etc.), such that each of the clips 16, 18 is monolithic in construction. In some embodiments, however, one of the clips 16, 18 comprises at least one of the first arm 34, second arm 36, handle 40, and flange 52 as a component fixed (e.g. via a fastener, bond, weld, etc.) to one of the other such components.

With continued respect to each of the clips 16, 18, individually, as introduced above, the first arm 34 typically comprises the flange 52. For example, in particular embodiments, the flange 52 projects from a surface 50 of the first arm 34 in a direction substantially parallel to the second arm 36. However, the flange 52 need not be linear, but instead may extend from the surface 50 at an angle or combination of angles. For instance, in certain embodiments, the flange 52 is shaped to provide decreased resistance to installation of the slot fastener 10, increased resistance to removal of the slot fastener 10 when installed, etc., as will be appreciated from the description herein. In some embodiments, for example, the flange 52 comprises a first surface 56 extending laterally outward from a medial portion (not shown) of the first arm 34 at an angle shown generally at 58. In such embodiments, the first surface 56 of the flange 52 typically extends away from the second arm 36, such that the angle 58 is greater than about 90 degrees, such as from about 90 degrees to about 150 degrees, alternatively from about 100 degrees to about 150 degrees, alternatively from about 110 degrees to about 150 degrees, alternatively from about 120 degrees to about 135 degrees. As will be appreciated in view of the description herein, the first surface 56 of the flange 52 may be utilized to secure the slot fastener 10 upon installation. In these or other embodiments, the flange 52 comprises a second surface 57 extending laterally outward from the first arm 34 and toward the second arm 36. As will be appreciated in view of the description herein, the second surface 57 of the flange 52 may increase the ease of installation of the slot fastener 10. In some embodiments, the second surface 57 meets the first surface 56, e.g. at an angle shown generally at 54, such that the flange 52 of each of the clips 16, 18 comprises a triangular shape defined at least partially by the first and second surfaces 56, 57 thereof in conjunction with the first arm 34. For example, in some such embodiments the angle 54 is about 90 degrees. In particular embodiments, the angle 54 is from greater than 90 to about 160, alternatively from greater than 90 to about 140, alternatively from about 100 to about 140, degrees. In certain embodiments, the angle 54 is from about 60 to about 90, alternatively from about 70 to about 90, alternatively from about 80 to about 90, degrees. However, it is to be appreciated that the exact shape of the flange 52 is not limited, and may be selected by one of skill in the art (e.g. in view of an intended use of the slot fastener 10, the particular other components of the slot fastener 10 selected, etc.). For example, in certain embodiments, while not shown, the flange 52 comprises a substantially trapezoidal shape where the first and second surfaces 56, 57 define the perimeters of opposing legs of the trapezoid and the first arm 34 defines the base of the trapezoid.

Each of the clips 16, 18 of the slot fastener 10 is adapted to pivot laterally relative to the head 14 in response to movement of the handle 40 away from or toward the surface 22 of the body 12, respectively. In particular, the clips 16, 18 are each configured to alternate between an engaged configuration, shown generally at 46, and a disengaged configuration, shown generally at 48. It is to be appreciated that the configurational terms "engaged configuration" and "disengaged configuration" may be used herein with respect to a particular pivotable position of the clips 16, 18 as well as in relation to the entire slot fastener 10 as a whole, as positioning the clips 16, 18 with respect to the head 14 and the body 12 alternates the slot fastener 10 between the engaged configuration 46 and the disengaged configuration 48.

In certain embodiments, with respect to the clips 16, 18 in the engaged configuration 46, the handles 40 of the clips 16, 18 are positioned generally coplanar with and located proximal to the surface 22 of the body 12. In this position, the flanges 52 typically extend beyond the opposing lateral sides 30 of the head 14, as described above. Moreover, in some such embodiments, the handles 40 of the clips 16, 18 typically extend beyond the opposing lateral sides 13 (e.g. the lateral perimeter of) the body 12 when the slot fastener is in the engaged configuration 46.

In contrast, when the slot fastener 10 is in the disengaged configuration 48, the clips 16, 18 are pivotably positioned such that the handles 40 are spaced apart from the surface 22 of the body 12. For example, in certain embodiments, the handles 40 of the clips 16, 18 are pivotably rotated away from the surface 22 of the body 12, such as at an angle shown generally at 60 in FIG. 4 and described in further detail below. In such embodiments, the angle 60 increases as the slot fastener 10 alternates from the engaged configuration 46 to the disengaged configuration 48, e.g. via laterally inward rotation of the clips 16, 18. Conversely, the angle 60 decreases to about 0 degrees as the slot fastener 10 alternates from the disengaged configuration 48 to the engaged configuration 46, e.g. via 18 laterally outward rotation of the clips 16, 18. It is to be appreciated that the angle 60 may vary with respect to the disengaged configuration 48, e.g. based on the particular configuration of the handles 40, the flanges 52, the first and/or second arms 34, 36, etc. Typically, the angle 60 is from about 10 to about 90, alternatively from about 10 to about 80, alternatively from about 10 to about 70, alternatively from about 15 to about 80, alternatively from about 20 to about 80, alternatively from about 20 to about 60, degrees.

In some embodiments, the clips 16, 18 may include a locking mechanism, such as a mechanical lock (e.g. snap-fit, etc.), a tension lock (e.g. via spring bias, detent, etc.), etc. In such embodiments, the locking mechanism may be used to hold, bias, or otherwise encourage the clips 16, 18 to remain in and/or rotate to a particular pivotable position with respect to the head 14 and the body 12, such as in a fully outwardly pivoted position (e.g. the engaged configuration 46), a fully inwardly pivoted position (i.e., the disengaged configuration 48), or somewhere therebetween. Likewise, it is to be appreciated that the slot fastener 10 may comprise such locking mechanisms on other components, such as the body 12 and/or head 14, which interact with the clips 16, 18 in a similar fashion. The locking mechanism is shown by example in FIGS. 2 and 4 as a spring member 59.

The various elements of the components of the embodiments of the slot fastener 10 described above, e.g. the body 12, the head 14, and the clips 16, 18, may be manufactured of the same or different material(s), such as any one or more of the materials described below. For example, in some embodiments, the slot fastener 10 is monolithic in construction and substantially homogeneous in composition. However, the slot fastener 10 may comprise multiple components joined together. Moreover, each component may itself comprise a combination of different materials, and thus may not comprise a homogeneous composition throughout. In general, materials suitable for use in or as the slot fastener 10 (e.g. the body 12, the head 14, the clips 16, 18, and the various portions thereof) include metals (e.g. steels, aluminums, alloys, etc.), resins (e.g. thermoset and/or thermoplastic resins), and combinations thereof. However, myriad materials may be used to manufacture the elements of the slot fastener 10, with each typically being selected as a function of availability, cost, performance/end use applications, etc. Moreover, metals, metal alloys, resins are not exhaustive of suitable materials that may be used. Moreover, a surface or portion thereof of a particular component of the slot fastener 10 may be coated or painted with a material having desired characteristics including, but not limited to, those described above or below.

In various embodiments, the slot fastener 10 comprises a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The slot fastener 10, as provided above, is adapted to be secured (e.g. fastened) into a channel 28 (e.g. a slot) of a component 80. This process may be referred to as installation of the slot fastener 10, and a method of so installing the slot fastener 10 (i.e., the "installation method") is provided herein. In general, the installation method includes inserting, or otherwise disposing, the head 14 of the slot fastener 10 into the channel 28 of the component 80.

The various channels 28 with which the slot fastener 10 may be used is not limited. Example of particularly suited channels include T-slots, C-slots, and various other internally-flanged channels. It is to be appreciated that the terms "channel" and "slot" may be used interchangeably, such that the channel 28 may also be referred to as the "slot" 28. Moreover, non-flanged/rimmed channels may also be used. For example, the channel 28 may define lateral notches along the sides thereof, a slit, a slot, a hole, and/or a gap in, on, or between panels (not shown), etc., into which the slot fastener 10 may be installed. Likewise, the component 80 is also not limited, and may be any article in which the slot, slit, etc. represented by the channel 28, is defined or otherwise disposed in or on.

Typically, as shown in FIG. 2, the channel 28 comprises an opening width 26. The opening width 26 is not limited, but may guide the selection/configuration of the slot fastener 10. For example, the slot fastener 10 is typically configured such that the opposing lateral sides of the head 14 fit within opening width 26 of the channel 28, e.g. to allow passage of the head 14 into the channel 28. Additionally, the slot fastener 10 is typically configured such that flanges 52 of the clips 16, 18, do not fit within the opening width 26 of the channel 28 when the slot fastener 10 is in the engaged configuration. Moreover, the slot fastener 10 is also typically such that the surface 22 of the body 12 of the slot fastener 10 does fit within the opening width 26 of the channel 28. As such, in certain embodiments, inserting the head 14 of the slot fastener 10 further comprises placing the surface 22 of the body 12 of the slot fastener 10 proximal to or in contact with an outer surface (not shown) of the component 80. In particular embodiments, during insertion of head 14 of the slot fastener 10 into the channel 28, the clips 16, 18 may contact the outer surface (not shown) of the component 80 adjacent edges of the slot 28. In such embodiments, the method may include forcibly encouraging the clips 16, 18 to rotate laterally inward (e.g. by contacting the second surface 80 of the clips 16, 18 with the outer surface (not shown) of the component 80), thereby placing the slot fastener 10 into the disengaged configuration 48.

Figure 3:
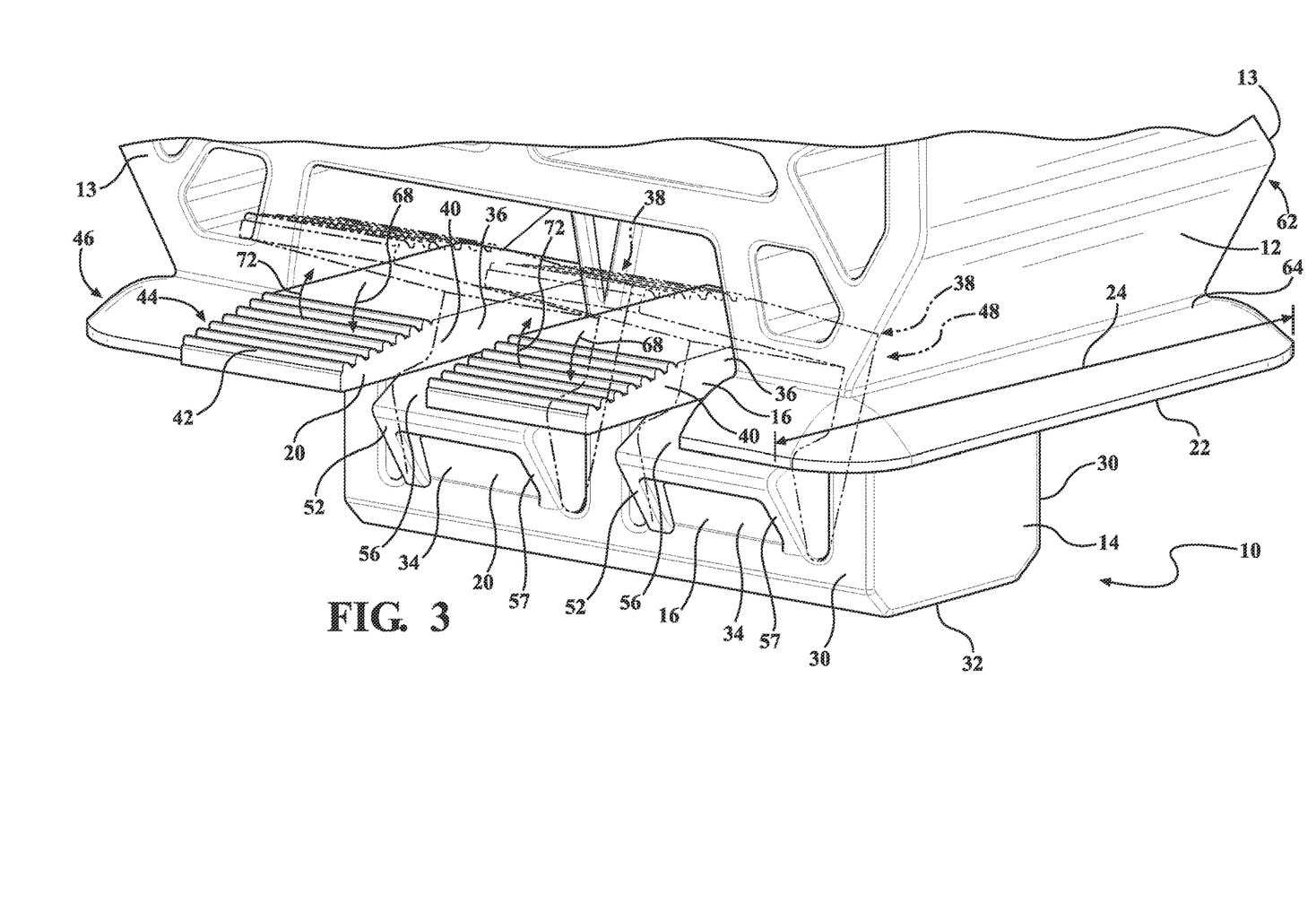
FIG. 3 is a profile view of a slot fastener, in accordance with particular embodiments of the present disposure, in an engaged configuration (solid lines) and a disengaged configuration (phantom lines)

Once the head 14 of the slot fastener 10 is inserted into the channel 28, the installation method includes placing the slot fastener 10 into the engaged configuration 46, thereby completing the installation. In general, as described above, placing the slot fastener 10 into the engaged configuration 46 comprises pivoting each of the clips 16, 18 laterally outward with respect to the head 14 and the body 12. Typically, such pivoting may be accomplished by moving the handles 40 of the clips 16, 18 laterally outward and toward the surface 22 of the body 12 of the slot fastener, e.g. as illustrated generally at 68 in FIG. 3. As such, in some embodiments, the method includes moving the handles 40 of the clips 16, 18 laterally outward and toward the surface 22 of the body 12 to place the slot fastener 10 in the engaged configuration 46, such that flanges 52 of the clips 16, 18 each contact an inner surface (not shown) of the component 80. More specifically, in such embodiments, placing the slot fastener 10 in the engaged configuration 46 secures the slot fastener 10 within the channel 28, e.g. by trapping a portion of the component 80 defining the opening width 26 between the surface 22 and the flanges 52 of the slot fastener 10 (i.e., thereby preventing removal of the head 14 from the channel 28). Once secured within the channel 28 (i.e., installed), the slot fastener 10 and the component 80 cooperatively form an assembly 82, which may be utilized in various end use applications.

Once installed, the slot fastener 10 may be removed, adjusted and/or repositioned within/along the channel 28. As such, a method of adjusting and/or repositions the slot fastener 10 along the channel 28 (i.e., the "adjustment method") is also provided. The adjustment method includes installing the slot fastener 10 in the channel 28 as described above. The adjustment method further includes placing the slot fastener 10 in the disengaged configuration 48, e.g. by moving the handles 40 of each clip 16, 18 laterally inward and away from the surface 22 of the body 12 (i.e., inwardly pivoting each clip 16, 18, as illustrated generally at 72 in FIG. 3). Once placed into the disengaged configuration 48, and thus unsecured from within the channel 28, the slot fastener 10 may be moved along the channel 28, e.g. with or without removing the head 14 of the slot fastener 10 therefrom. As such, the adjustment method includes moving the slot fastener 10 along the channel 28, e.g. along the path illustrated generally at 70 in FIG. 5, and then placing the slot fastener 10 into the engaged configuration 46 as described above.

A method of removing/uninstalling the slot fastener 10 from the channel 28 (i.e., the "removal method") is further provided. The removal method includes providing the assembly 82 described above. The removal method also includes placing the slot fastener 10 in the disengaged configuration 48 (e.g. without the use of a tool). The removal method further includes withdrawing the head 14 of the slot fastener 10 from the channel 28, thereby removing the slot fastener 10 therefrom.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", and "parallel" are generally employed herein in a relative and not an absolute sense.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A slot fastener, comprising:
   a body having a surface, the surface having a lateral width;
   a head extending from the surface of the body, the head comprising opposing lateral sides, which are laterally separated by a distance that is less than the lateral width of the surface of the body; and
   a pair of clips, each of the clips being disposed at the opposing lateral sides of the head, each of the clips including a flange projecting laterally outward from the opposing lateral sides of the head and a handle projecting outwardly from opposing lateral sides of the body;
   wherein each of the clips is adapted to pivot laterally relative to the head to alternate between an engaged configuration and a disengaged configuration in response to movement of the handle toward or away from the surface of the body, respectively, and a locking mechanism is adapted to secure the clips in the engaged configuration in which the clips are in an outwardly pivoted position and to prevent the clips from pivoting to the disengaged configuration.

2. The slot fastener of claim 1, wherein in the engaged configuration the flange of each of the clips extends beyond a lateral perimeter of the head, and wherein in the disengaged configuration the flange of each of the clips is disposed between the opposing lateral sides of the head.

3. The slot fastener of claim 1, wherein each of the clips includes a first arm comprising the flange and a second arm comprising the handle, and wherein the first and second arms are configured to form a substantially "L"-shape.

4. The slot fastener of claim 3, wherein the flange of each of the clips comprises a first surface extending laterally outward from a medial portion of the first arm and away from the second arm.

5. The slot fastener of claim 4, wherein the flange of each of the clips comprises a second surface extending laterally outward from an end portion of the first arm and toward the second arm.

6. The slot fastener of claim 1, wherein in the engaged configuration the handle of each of the clips is generally coplanar with and located proximal to the surface of the body, and wherein in the disengaged configuration the handle of each of the clips forms an acute angle with and is located distal to the surface of the body.

7. The slot fastener of claim 1, wherein the handle of each of the clips extends beyond lateral perimeters of the body when the slot fastener is in the engaged configuration.

8. The slot fastener of claim 1, wherein the body is configured to be coupled to a pipe or tube.

9. The slot fastener of claim 8, wherein: (i) the body comprises a pipe or tube fastener; (ii) the body is adapted to be disposed within an end of the pipe or the tube; or (iii) both (i) and (ii).

10. The slot fastener of claim 1, wherein the pair of clips is further defined as a first pair of clips and a second pair of clips, the first and second pairs of clips being disposed along the opposing lateral sides of the head.

11. The slot fastener of claim 1, wherein: (i) the head and the body are integrally formed; (ii) each of the clips is monolithic in construction; or (iii) both (i) and (ii).

12. The slot fastener of claim 1, wherein: (i) the body comprises a polymeric material; (ii) the head comprises a polymeric material; or (iii) both (i) and (ii).

13. A method of installing the slot fastener, comprising:
providing the slot fastener, wherein the slot fastener is the slot fastener of claim 1;
inserting the head of the slot fastener into a channel of a component; and
pivoting each of the clips of the slot fastener by moving the handles laterally outward and toward the surface of the body to place the slot fastener in the engaged configuration, thereby installing the slot fastener.

14. The method of claim 13, wherein inserting the head of the slot fastener further comprises placing the surface of the body of the slot fastener proximal to or in contact with an outer surface of the component, and wherein the flange of each of the clips of the slot fastener contacts an inner surface of the component when the slot fastener is in the engaged configuration, thereby preventing removal of the head of the slot fastener from the channel.

15. The method of repositioning the slot fastener along the channel, comprising:
installing the slot fastener in the channel in accordance with the method of claim 13;
pivoting each of the clips of the slot fastener by moving the handles laterally inward and away from the surface of the body, thereby placing the slot fastener in the disengaged configuration;
moving the head of the slot fastener along a length of the channel without removing the head therefrom; and
placing the slot fastener in the engaged configuration, thereby repositioning the slot fastener along the channel.

* * * * *